United States Patent
Chen

(10) Patent No.: US 8,751,609 B2
(45) Date of Patent: Jun. 10, 2014

(54) DESTINATION PLANNING METHOD

(75) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 109 days.

(21) Appl. No.: 13/606,462

(22) Filed: Sep. 7, 2012

(65) Prior Publication Data

US 2014/0074940 A1    Mar. 13, 2014

(51) Int. Cl.
*G06F 15/16* (2006.01)
*G08G 1/123* (2006.01)

(52) U.S. Cl.
USPC .......................................... 709/219; 701/532

(58) Field of Classification Search
CPC ........... H04L 29/08693; G01C 21/34–21/3676
USPC ................................ 709/203, 206, 213–219;
455/456.1–456.6; 701/400–411, 461, 701/532–533
See application file for complete search history.

(56) References Cited

U.S. PATENT DOCUMENTS

| | | | | |
|---|---|---|---|---|
| 6,600,990 | B2 * | 7/2003 | Takenaga | 701/454 |
| 2003/0182052 | A1 * | 9/2003 | DeLorme et al. | 701/201 |
| 2005/0027442 | A1 * | 2/2005 | Kelley et al. | 701/202 |
| 2005/0181769 | A1 * | 8/2005 | Kogawa | 455/413 |
| 2006/0178813 | A1 * | 8/2006 | Chen | 701/202 |
| 2008/0227429 | A1 * | 9/2008 | Hodgson et al. | 455/404.2 |

* cited by examiner

*Primary Examiner* — Brendan Higa
(74) *Attorney, Agent, or Firm* — Banger Shia

(57) ABSTRACT

A destination planning method suitable for use on a vehicle comprises the following steps: a, destination editing and file transmission; b, using electronic apparatus or navigation device to receive the file; and c, using the destination file. The destination file can be automatically sent to the navigation device after it is edited by a sender, which improves the ease of use and solves the inconvenience caused manual operation.

14 Claims, 7 Drawing Sheets a. destination editing and file transmission b. using electronic apparatus or navigation device to receive the file c. using the destination file

DESTINATION PLANNING METHOD

BACKGROUND OF THE INVENTION

1. Field of the Invention

The present invention relates to a destination planning method, and more particularly to a destination planning method suitable for use on a vehicle.

2. Description of the Prior Art

A GPS navigation device has become a necessity for many people due to its super real-time navigation function.

In terms of destination planning, there are many map services (such as Google maps or online maps) available on the internet today, in addition to providing map search to the users around the world, the map services also help the users to do destination planning (calculate an optimum route to the destination).

When the route to the destination is calculated, the route data can be saved in a file and sent by e-mail to anybody (including the people with or without a navigation device), and the electronic products for receiving the route data can be smart phone or computer. At this moment, transmitting the route data from the smart phone or the computer to a navigation device requires the use of transmission technology (such as Bluetooth, infrared, etc). Furthermore, data input through vehicle navigation interface is complicated and inconvenient.

The present invention has arisen to mitigate and/or obviate the afore-described disadvantages.

SUMMARY OF THE INVENTION

The primary object of the present invention is to provide a destination planning method suitable for use on a vehicle, wherein the destination file can be automatically sent to the navigation device after it is edited by a sender, which improves the ease of use and solves the inconvenience caused manual operation.

To achieve the above objects, a destination planning method in accordance with the present invention comprises the following steps: editing, by a sender, a destination on a map site, a database of the map site includes at least one login account which includes: a navigation device serial number, an e-mail address, and a telephone number; forming a first destination file and a second destination file at the map site after editing the destination;

receiving, by the map site, from a sender, at least one e-mail address of a receiver;

determining, by the map site, whether the at least one e-mail address of the receiver matches the e-mail address included in the at least one login account, wherein if the e-mail address is not the same as the e-mail address of the at least one login account, then sending, by the map site, the first destination file to the receiver by e-mail, and if the e-mail address of the receiver is the same as the e-mail address of the at least one login account, then determining, by the map site, a corresponding telephone number based on the e-mail address of the receiver, sending, by the map site, the first destination file to the receiver by e-mail, and sending, by the map site, the second destination file by push notification to the corresponding telephone number;

receiving the push notification of the second destination file by an electronic apparatus, the electronic apparatus associated with the telephone number, wherein an APP exclusive to the map site is installed on the electronic apparatus;

connecting the electronic apparatus to a navigation device;

sending, by the APP, the second destination file by push notification to the navigation device;

receiving the second destination file at the navigation device;

displaying the second destination file on a display module of the navigation device; and receiving, by the navigation device, a selection from the receiver to start a navigation to a destination defined by the second destination file or saving the second destination file in the navigation device.

Yet, another destination planning method in accordance with the present invention comprises the following steps:

editing a destination on a map site by a sender;

forming a destination file at the map site based on the editing of the destination;

receiving, by the map site, from the sender, at least one e-mail address of a receiver;

sending, by the map site, the destination file to the at least one e-mail address of the receiver via a push notification;

receiving the push notification of the destination file by an electronic apparatus, wherein an APP exclusive to the map site is installed on the electronic apparatus;

connecting the electronic apparatus to a navigation device;

sending, by the APP, the destination file by push notification to the navigation device;

receiving the destination file at the navigation device;

displaying the destination file on a display module of the navigation device; and receiving, by the navigation device, a selection to start a navigation to a destination defined by the destination file or saving the second destination file in the navigation device.

Preferably, the electronic apparatus receives the second destination file sent from the map site via 3G or 4G.

Preferably, the electronic apparatus is connected to the navigation device by WI-FI, Bluetooth and infrared.

Preferably, the electronic apparatus is a smart phone or a tablet computer.

Preferably, the first destination file is a website address or an APP file, clicking the website address will take the receiver to a web page on the map site edited by the sender, and the APP file is exclusive to the map site.

Preferably, Preferably, the first destination file is a website address and an annex, clicking the website address will take the receiver to a web page on the map site edited by the sender, and the annex includes coordinates of the destination and related information.

Preferably, the first destination file is an APP file exclusive to the map site.

Preferably, the second destination file includes coordinates of the destination and related information.

Preferably, the e-mail address is sent by SMS, messages, MSN, Yahoo instant message, and SKYPE.

DETAILED DESCRIPTION OF THE PREFERRED EMBODIMENTS

Figure 1:
FIG. 1 is a flow chart of a destination planning method in accordance with a first embodiment of the present invention.
Figure 1:
Figure 2:
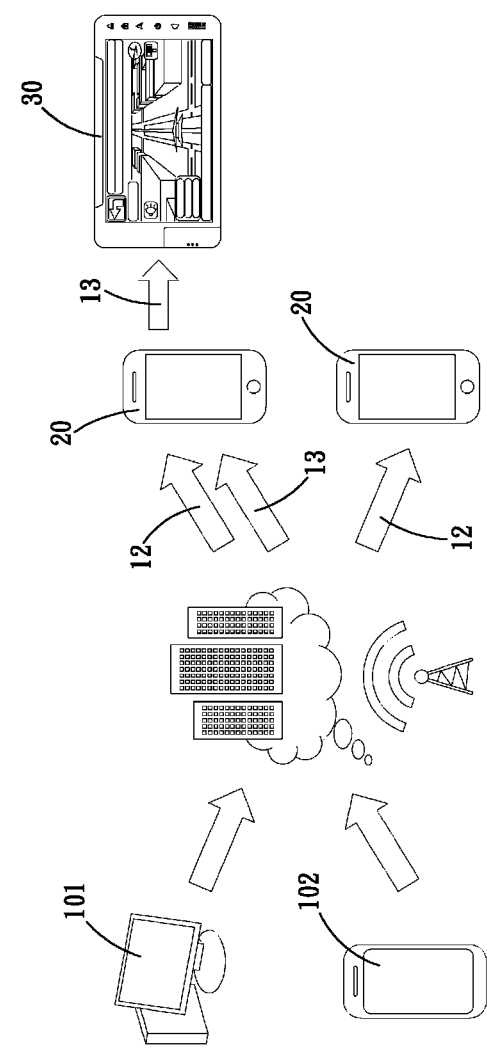
FIG. 2 is a system architecture overview showing the destination planning method in accordance with the first embodiment of the present invention.
Figure 3:
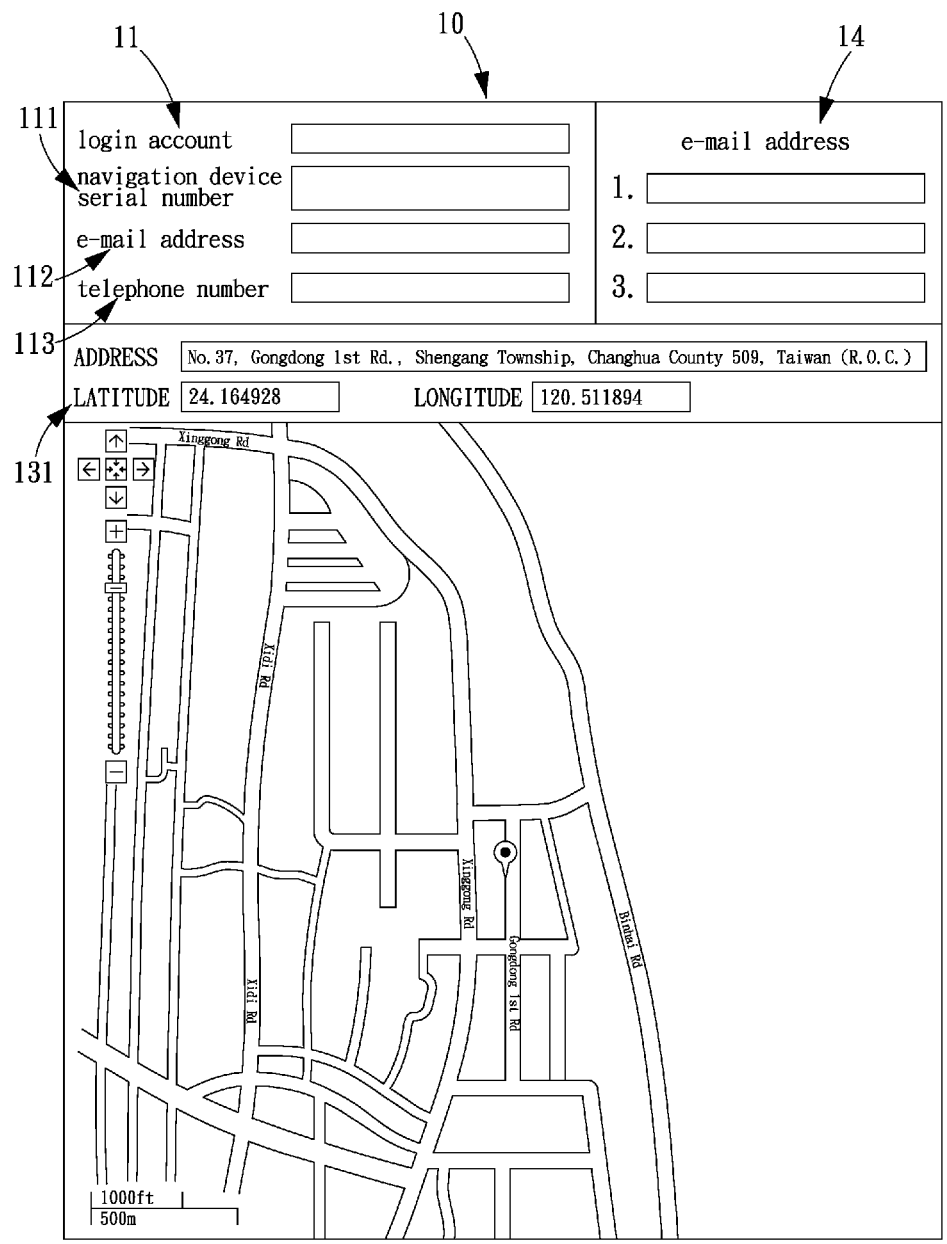
FIG. 3 is an illustrative view of a map site of the destination planning method in accordance with the first embodiment of the present invention.
Figure 4:
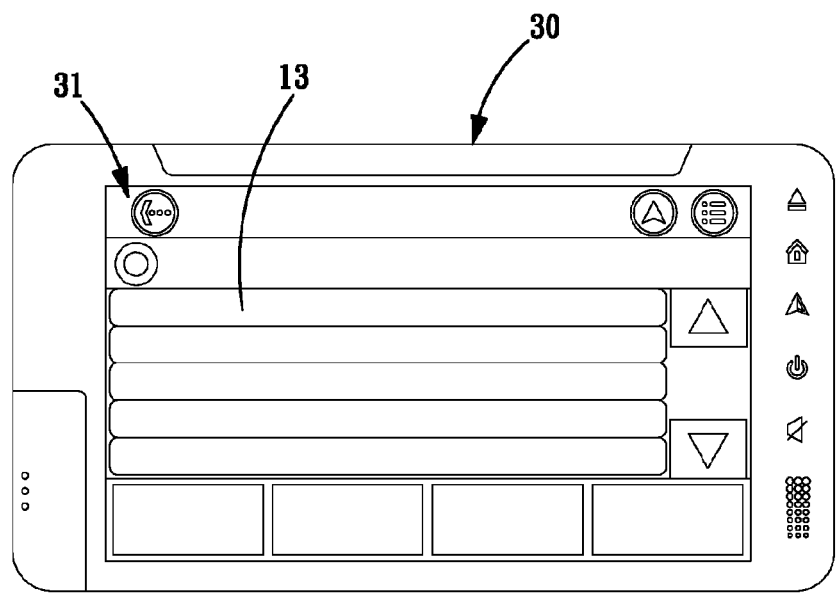
FIG. 4 is an illustrative view of a navigation device used combination with the destination planning method in accordance with the first embodiment of the present invention, wherein the second destination file is displayed on the display module.
Figure 5:
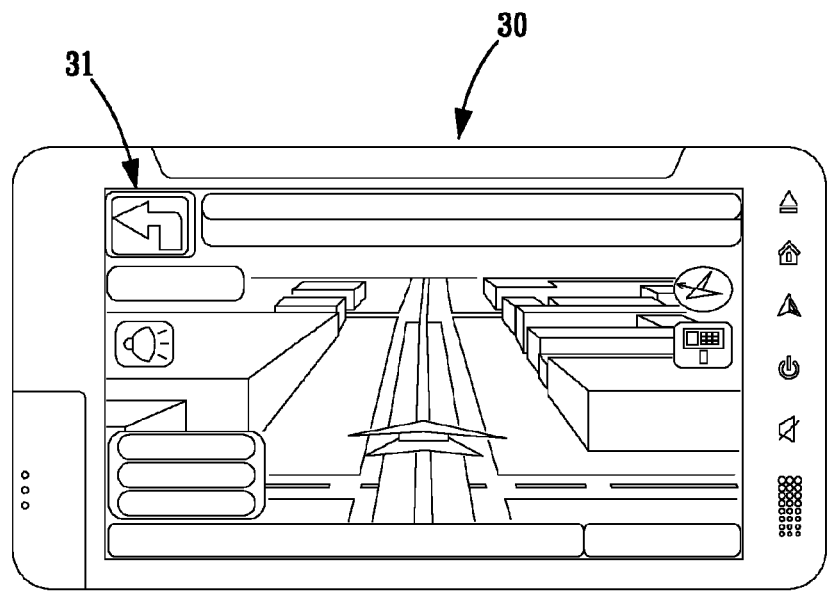
FIG. 5 is an illustrative view of the navigation device used combination with the destination planning method in accordance with the first embodiment of the present invention, wherein the display module is in a navigation state.

The present invention will be clearer from the following description when viewed together with the accompanying drawings, which show, for purpose of illustrations only, the preferred embodiment in accordance with the present invention.

Referring to FIGS. 1-5, a destination planning method in accordance with a first embodiment of the present invention comprises the steps of: a, destination editing and file transmission; b, using electronic apparatus or navigation device to receive the file; and c, using the destination file.

The step a of destination editing and file transmission: the sender can edit a destination on a map site 10 by using a computer 101 or a smart phone 102, or a tablet computer, etc.

The database of the map site 10 includes at least one login account 11 which includes: a navigation device serial number 111, an e-mail address 112, a telephone number 113.

A first destination file 12 and a second destination file 13 will be formed after the destination editing is done. The first destination file 12 is a website address, clicking the website address will take the receiver to a web page on the map site 10 edited by the sender. The first destination file 12 can also be an APP file containing the destination map and related information, and the APP file is exclusive to the map site 10. The second destination file 13 includes coordinates 131 of the destination and related information.

The sender inputs at least one e-mail address 14 of the receiver. The map site 10 will search to find out whether the e-mail address 14 is the same as the e-mail address 112 of the login account 11. If the e-mail address 14 is not the same as the e-mail address 112 of the login account 11, the first destination file 12 will be sent to the receiver by e-mail. If the e-mail address 14 is the same as the e-mail address 112 of the login account 11, in addition to that the first destination file 12 will be sent to the receiver by e-mail, the map site 10 will find a corresponding telephone number 113 based on the inputted e-mail address 14, and then send the second destination file 13 by push notification to the corresponding telephone number 113.

The e-mail address 14 can also be sent by other methods, such as SMS, messages, MSN, Yahoo instant message, SKYPE, etc.

The step b of using electronic apparatus or navigation device to receive the file: an internet connectable electronic apparatus 20 with the telephone number 113 of the login account 11, and the electronic apparatus 20 is a smart phone 102 or a tablet computer. In this embodiment, the electronic apparatus 20 is a smart phone 102.

On the electronic apparatus 20 is installed an APP exclusive to the map site 10. The electronic apparatus 20 receives the second destination file 13 sent by push notification from the map site 10 via 3G or 4G.

When the electronic apparatus 20 is connected to the navigation device 30, the APP will send (by push) the second destination file 13 from the electronic apparatus 20 to the navigation device 30. The electronic apparatus 20 can be connected to the navigation device 30 by WI-FI, Bluetooth or infrared.

The step c of using the destination file: the navigation device 30 will automatically display the second destination file 13 on a display module 31 after receiving the second destination file 13 sent by push from the electronic apparatus 20, so that the receiver can choose the second destination file 13 as the destination and then start navigation, or the receiver can choose to save the second destination file 13 in the navigation device 30. If the destination file is preset with time and date, and it will be automatically displayed on the display module at the preset time and date.

After receiving the second destination file 13 and starting navigation by using the second destination file 13 as the destination, the navigation device 30 will calculate a route to the destination based on the distance from the current position to the destination.

The first destination file 12 is not limited to being used by the user of the navigation device 30, it can be used by anybody, including a person who has no login account 11. Anybody can send the first destination file 12 by e-mail to the electronic apparatus 20, so that the receiver who doesn't have a navigation device 30 is also able to read the first destination file 12, improving the ease of use. However, the electronic apparatus 20 itself is unable to open the first destination file 12, only the receiver can open the first destination file 12 and read it. The navigation device 30 itself is either unable to open the first destination file 12, only the receiver can open the first destination file 12 and read it. The second destination file 13 is automatically opened by the electronic apparatus 20 and sent by push notification to the navigation device 30, but the receiver is unable to read the second destination file 13 sent by push notification.

Therefore, after the user edited the destination, the destination file can be automatically sent to the navigation device, which improves the ease of use and solves the inconvenience caused manual operation. Especially in the step b of using electronic apparatus or navigation device to receive the file, when the electronic apparatus 20 is connected to the navigation device 30, the APP will automatically send (by push) the second destination file 13 from the electronic apparatus 20, thus avoiding the inconvenience of the data input through vehicle navigation interface.

Figure 6:
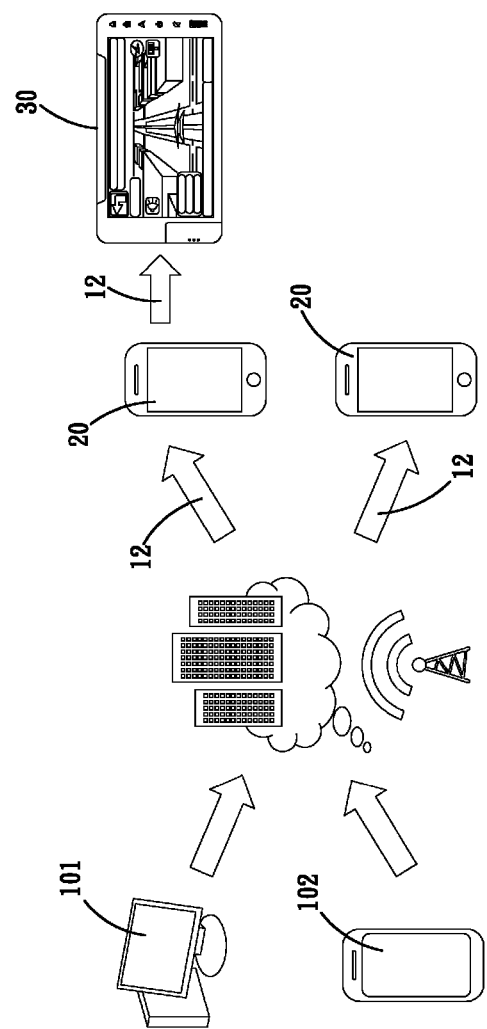
FIG. 6 is a system architecture overview showing the destination planning method in accordance with a second embodiment of the present invention.
Figure 7:
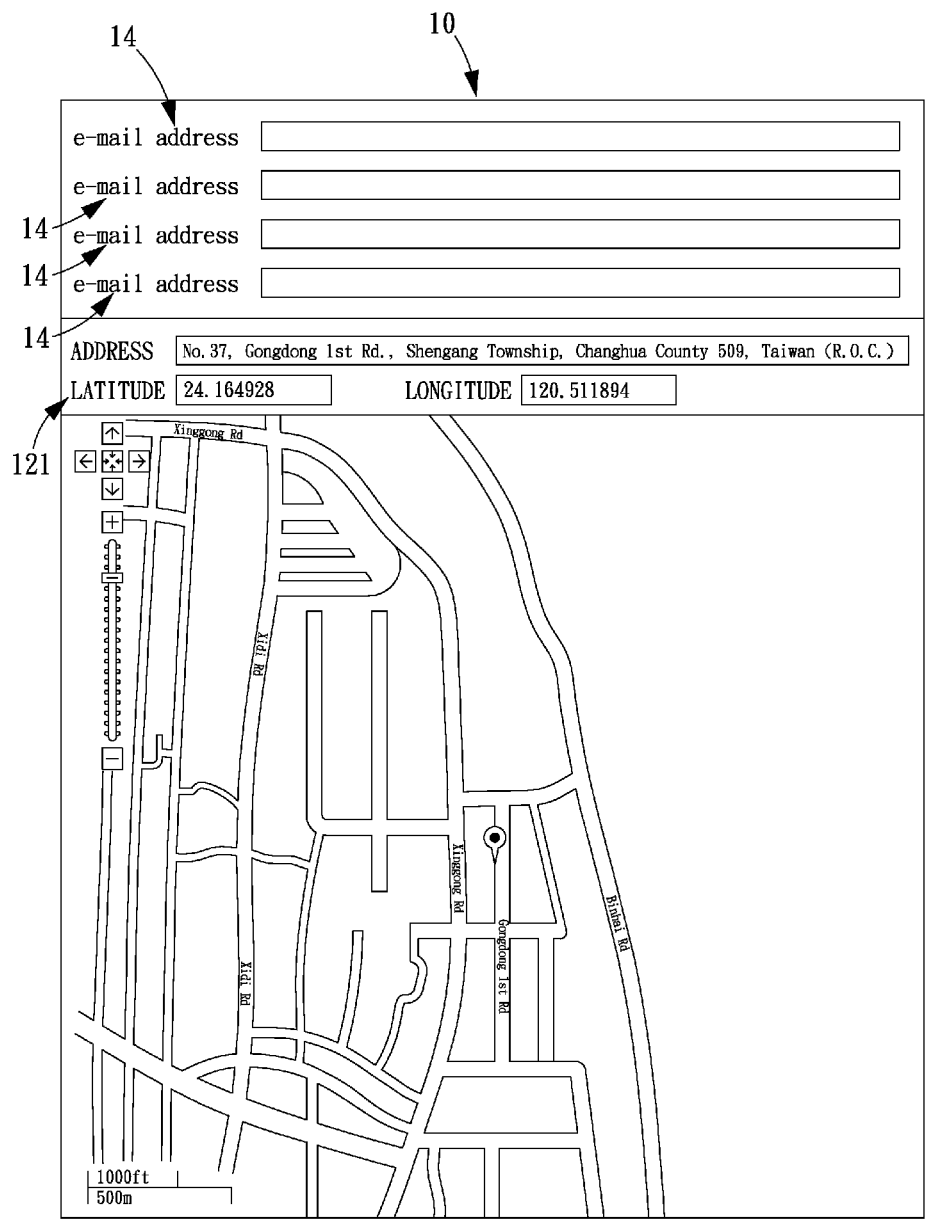
FIG. 7 is an illustrative view of a map site of the destination planning method in accordance with the second embodiment of the present invention.

Referring to FIGS. 6 and 7, a destination planning method in accordance with a second embodiment of the present invention also comprises the steps of: a, destination editing and file transmission; b, using electronic apparatus or navigation device to receive the file; and c, using the destination file. The destination planning method of the second embodiment is similar to the first embodiment, except that:

The step a of destination editing and file transmission: the sender can edit a destination on a map site 10 by using a computer 101 or a smart phone 102, or a tablet computer, etc. A first destination file 12 will be formed after the destination editing is done. The sender inputs at least one e-mail address 14 of the receiver, the map site 10 will send the first destination file 12 by e-mail to the at least one e-mail address 14. The first destination file 12 includes a website address and an annex, clicking the website address will take the receiver to a web page on the map site 10 edited by the sender. The annex includes coordinates 121 of the destination and related information. The first destination file 12 can be an APP file exclusive to the map site 10, and the APP file contains the destination map and related data.

The step b of using electronic apparatus or navigation device to receive the file: the electronic apparatus 20 is connectable to the internet, and on the electronic apparatus 20 is installed an APP exclusive to the map site 10. The electronic apparatus 20 receives the first destination file 12 sent by push notification from the map site 10. When the electronic apparatus 20 is connected to the navigation device 30, the APP will send (by push) the first destination file 12 to the navigation device 30 from the electronic apparatus 20.

The step c of using the destination file: the navigation device 30 will automatically display the first destination file 12 on a display module 31 after receiving the first destination file 12 sent by push from the electronic apparatus 20, so that the receiver can choose the first destination file 12 as the destination and then start navigation, or the sender can choose to save the first destination file 12 in the navigation device 30.

The first destination file 12 of this second embodiment is not limited to being used by the user of the navigation device 30, it can be used by anybody, including a person who has no login account 11. Anybody can send the first destination file 12 by e-mail to the electronic apparatus 20, so that the receiver who doesn't have a navigation device 30 is also able to read the first destination file 12, improving the ease of use. However, the electronic apparatus 20 itself is unable to open the first destination file 12, only the receiver can open the first destination file 12 and read it. The first destination file 12 is automatically opened by the electronic apparatus 20 and sent by push notification to the navigation device 30, the receiver can open and read the first destination file 12 but is unable to read the annex of the first destination file 12 sent by push notification, thus avoiding the inconvenience of the data input through vehicle navigation interface.

While we have shown and described various embodiments in accordance with the present invention, it is clear to those skilled in the art that further embodiments may be made without departing from the scope of the present invention.

What is claimed is:

1. A destination planning method comprising the following steps:
   editing a destination on a map site, the map site having a database including at least one login account which includes: a navigation device serial number, an e-mail address, and a telephone number;
   forming a first destination file and a second destination file at the map site after editing the destination;
   receiving, by the map site, from a sender, at least one e-mail address of a receiver;
   determining, by the map site, whether the at least one e-mail address of the receiver matches the e-mail address included in the at least one login account, wherein if the e-mail address of the receiver is not the same as the e-mail address of the at least one login account, then sending, by the map site, the first destination file to the receiver by e-mail, and if the e-mail address of the receiver is the same as the e-mail address of the at least one login account, then
   determining, by the map site, a corresponding telephone number based on the e-mail address of the receiver,
   sending, by the map site, the first destination file to the receiver by e-mail, and
   sending, by the map site, the second destination file by push notification to the corresponding telephone number;
   receiving the push notification of the second destination file by an electronic apparatus, the electronic apparatus associated with the telephone number, wherein an APP exclusive to the map site is installed on the electronic apparatus;
   connecting the electronic apparatus to a navigation device:
   sending, by the APP, the second destination file by push notification to the navigation device;
   receiving the second destination file at the navigation device;
   displaying the second destination file on a display module of the navigation device; and
   receiving, by the navigation device, a selection from the receiver to start a navigation to a destination defined by the second destination file or saving the second destination file in the navigation device.

2. The destination planning method as claimed in claim 1, wherein the electronic apparatus receives the second destination file sent from the map site via 3G or 4G.

3. The destination planning method as claimed in claim 1, wherein the electronic apparatus is connected to the navigation device by WI-FI, Bluetooth and infrared.

4. The destination planning method as claimed in claim 1, wherein the electronic apparatus is a smart phone or a tablet computer.

5. The destination planning method as claimed in claim 1, wherein the first destination file is a website address or an APP file, clicking the website address will take the receiver to a web page on the map site edited by the sender, and the APP file is exclusive to the map site.

6. The destination planning method as claimed in claim 1, wherein the second destination file includes coordinates of the destination and related information.

7. The destination planning method as claimed in claim 1, wherein the e-mail address is sent by SMS, messages, MSN, Yahoo instant message, and SKYPE.

8. A destination planning method comprising the following steps:
   editing a destination on a map site by a sender;
   forming a destination file at the map site based on the editing of the destination;
   receiving, by the map site, from the sender, at least one e-mail address of a receiver;
   sending, by the map site, the destination file to the at least one e-mail address of the receiver via a push notification;
   receiving the push notification of the destination file by an electronic apparatus, wherein an APP exclusive to the map site is installed on the electronic apparatus;
   connecting the electronic apparatus to a navigation device;
   sending, by the APP, the destination file by push notification to the navigation device;
   receiving the destination file at the navigation device;
   displaying the destination file on a display module of the navigation device; and
   receiving, by the navigation device, a selection to start a navigation to a destination defined by the destination file or saving the second destination file in the navigation device.

9. The destination planning method as claimed in claim 8, wherein the electronic apparatus receives the second destination file sent from the map site via 3G or 4G.

10. The destination planning method as claimed in claim 8, wherein the electronic apparatus is connected to the navigation device by WI-FI, Bluetooth and infrared.

11. The destination planning method as claimed in claim 8, wherein the electronic apparatus is a smart phone or a tablet computer.

12. The destination planning method as claimed in claim 8, wherein the first destination file is a website address and an annex, clicking the website address will take the receiver to a web page on the map site edited by the sender, and the annex includes coordinates of the destination and related information.

13. The destination planning method as claimed in claim 8, wherein the first destination file is an APP file exclusive to the map site.

14. The destination planning method as claimed in claim 8, wherein the e-mail address is sent by SMS, messages, MSN, Yahoo instant message, and SKYPE.

* * * * *